United States Patent
Watanabe et al.

(10) Patent No.: US 6,547,300 B2
(45) Date of Patent: Apr. 15, 2003

(54) REAR BODY STRUCTURE FOR VEHICLE

(75) Inventors: Jun Watanabe, Tokyo-To (JP); Jun Chida, Tokyo-To (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/096,843

(22) Filed: Mar. 14, 2002

(65) Prior Publication Data

US 2002/0130526 A1 Sep. 19, 2002

(30) Foreign Application Priority Data

Mar. 15, 2001 (JP) ........................................ 2001-074182

(51) Int. Cl.$^7$ .............................................. B62D 43/00
(52) U.S. Cl. .................. 296/37.3; 296/37.8; 296/37.14; 296/37.15; 296/65.03; 296/68.1; 224/42.12; 224/42.13; 224/42.21
(58) Field of Search .............................. 296/37.3, 37.8, 296/37.14, 37.15, 65.03, 69, 68.1; 224/42.12, 42.13, 42.2, 42.21

(56) References Cited

U.S. PATENT DOCUMENTS

| | | | | |
|---|---|---|---|---|
| 3,840,247 A | * | 10/1974 | Radke | 280/801.1 |
| 4,099,771 A | * | 7/1978 | Mathews | 248/158 |
| 4,114,947 A | * | 9/1978 | Nelson | 248/503.1 |
| 5,178,434 A | * | 1/1993 | Krebs | 296/37.3 |
| 5,230,544 A | * | 7/1993 | Morritt et al. | 296/37.3 |
| 5,890,758 A | * | 4/1999 | Pone et al. | 296/66 |
| 5,921,606 A | * | 7/1999 | Moradell et al. | 296/65.03 |
| 5,957,521 A | * | 9/1999 | Schlachter | 296/37.15 |
| 5,971,462 A | * | 10/1999 | Bell et al. | 296/37.3 |
| 6,132,162 A | * | 10/2000 | Kito et al. | 254/323 |
| 6,145,907 A | * | 11/2000 | Maruyama et al. | 296/37.2 |
| 6,196,613 B1 | * | 3/2001 | Arai | 296/65.09 |
| 6,338,516 B1 | * | 1/2002 | Toyota et al. | 296/37.2 |
| 6,416,107 B1 | * | 7/2002 | Kanaguchi et al. | 296/37.3 |

FOREIGN PATENT DOCUMENTS

| | | | | |
|---|---|---|---|---|
| FR | 002687629 A1 | * | 8/1993 | |
| JP | 06179381 A | * | 6/1994 | |
| JP | 09109849 A | * | 4/1997 | |
| JP | 10129534 A | * | 5/1998 | |
| JP | 11278029 A | * | 10/1999 | |
| JP | 2000025656 A | * | 1/2000 | |

* cited by examiner

Primary Examiner—D. Glenn Dayoan
Assistant Examiner—Lori L Coletta
(74) Attorney, Agent, or Firm—Smith, Gambrell & Russell

(57) ABSTRACT

A rear body structure of a vehicle having a floor panel, a pocket provided on the floor panel for accommodating a spare tire assembly therein and a seat disposed above the pocket includes a reinforcement member hingedly connected with the floor panel and covering at least a part of the opening of the pocket for preventing the spare tire assembly from moving, a seat fixing section provided on the reinforcement member for detachably fixing the seat, and a seat belt anchoring section provided on the reinforcement member for anchoring an end portion of a seat belt.

9 Claims, 4 Drawing Sheets

REAR BODY STRUCTURE FOR VEHICLE

BACKGROUND OF THE INVENTION

1. Field of the invention

The present invention relates to a structure of a rear part of a vehicle body and more particularly to a structure including a pocket provided on a floor panel for accommodating a vehicle spare tire assembly therein and a reinforcement member covering an opening of the pocket.

2. Discussion of prior art

Generally, a vehicle spare tire assembly (hereinafter, referred to as just "spare tire") is accommodated in a pocket having a predetermined depth and formed in a rear part of a floor panel of a vehicle. Some of station wagon type or one box type vehicles have a plurality of seat rows arranged in a longitudinal direction of a passenger compartment thereof. Accordingly, sometimes the pocket comes under rearmost seat rows. The rearmost seats, in general, are detachable from a vehicle body for the purpose of bringing the spare tire out or for changing layouts of the passenger compartment. Further, the rearmost seats are secured to a reinforcement member extending in the widthwise direction of the vehicle and the reinforcement member is rigidly connected to the vehicle body.

According to the aforesaid rear body structure, there is a fear (drawback) that the spare tire is pushed out of the pocket and injures passengers sitting on the rearmost seat.

Further, since the rearmost seat integrally includes the reinforcement member extending in the widthwise direction of the vehicle, it is difficult to divide the rearmost seat into left and right ones and therefore the seat has a large volume and a large weight, this leading to a difficulty in installing or displacing the seat and providing restrictions in designing the seat.

SUMMARY OF THE INVENTION

It is an object of the present invention to provide a rear body structure of a vehicle capable of protecting passengers when the vehicle has a rear end collision and to provide a light weight seat having a variety (versatility) of designs.

To achieve the object, a rear body structure comprises a reinforcement member hingedly connected with a floor panel and covering at least a part of an opening of a pocket for accommodating a spare tire to prevent the spare tire from moving, a seat fixing section provided on the reinforcement member for detachably fixing the seat and a seat belt anchoring section provided on the reinforcement member for anchoring an end portion of a seat belt.

DESCRIPTION OF THE PREFERRED EMBODIMENT

Figure 1:
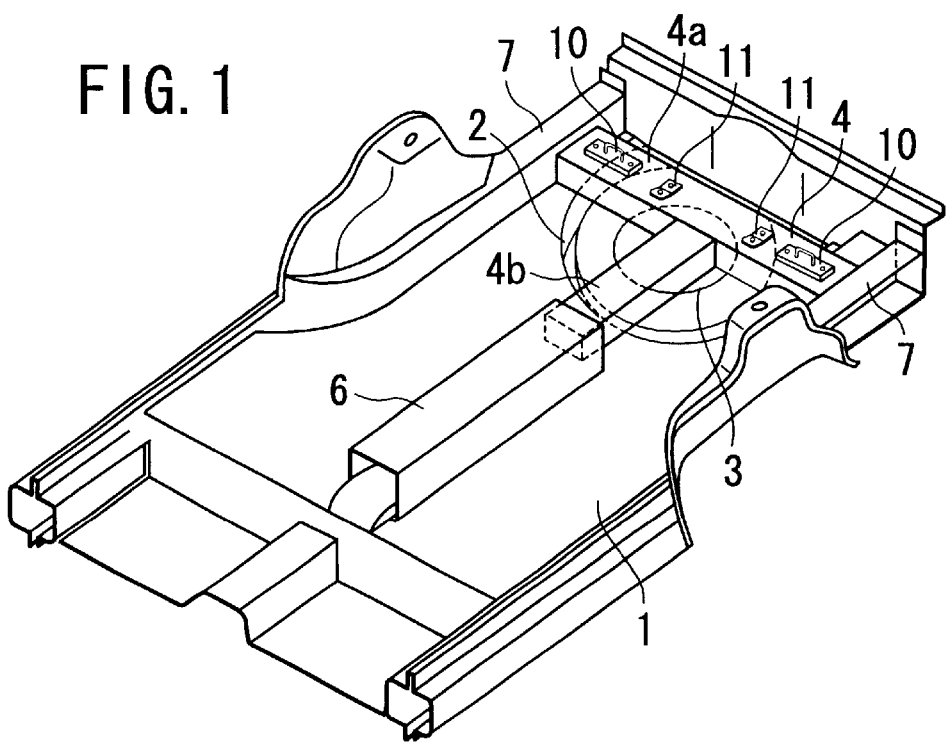
FIG. 1 is a perspective view showing a rear body structure of a vehicle according to an embodiment of the present invention.
Figure 2:
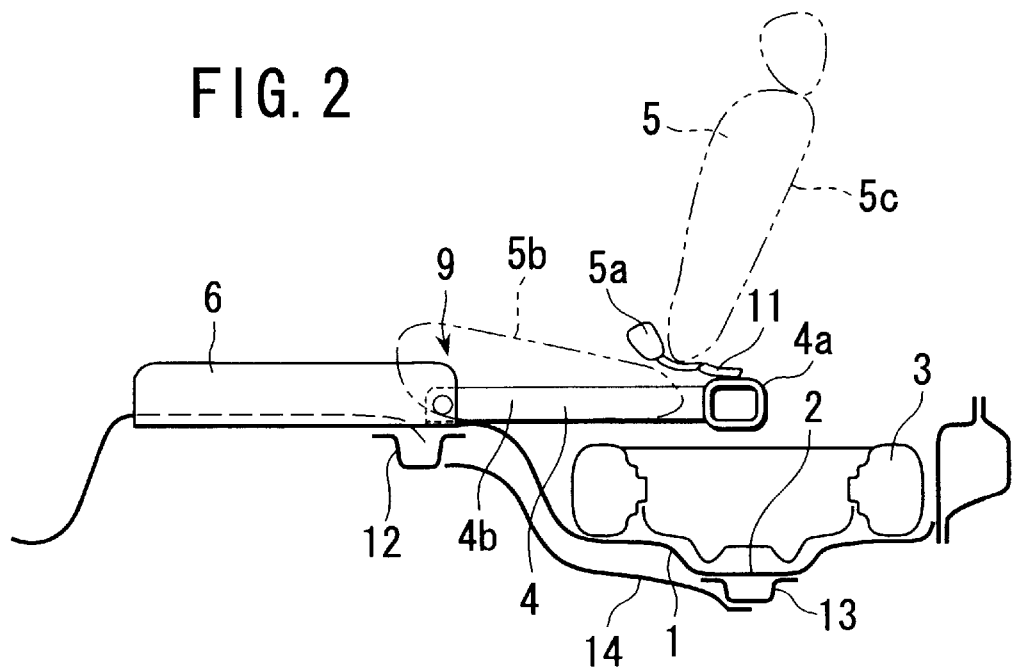
FIG. 2 is a schematic side view showing a rear body structure of a vehicle.

Referring to FIGS. 1 and 2, a floor panel 1 has a pocket 2 at the rear end portion thereof and a spare tire 3 is housed in the pocket 2. Further, a reinforcement member 4 is provided so as to partially cover an opening of the pocket 2. A seat disposed above the pocket 2 is detachably connected with the reinforcement member 4.

The floor panel 1 constitutes a substantially flat floor of a vehicle body. Further, a center member 6 longitudinally and rearwardly extending along a lateral center of the floor panel at the front of the pocket. Further, a pair of side members 7, 7 extending in a longitudinal direction of the vehicle are disposed at both widthwise ends of the floor panel 1. The center member 6 and side member 7 are secured to the floor panel 1 by welding, respectively. The center member 6 has an inverse U-shaped cross section when viewed longitudinally and is connected at the rear end thereof with the reinforcement member 4. The reinforcement member 4 is interlocked with respective side members 7, 7 by a lock-up mechanism which will be described hereinafter.

The pocket 2 extends longitudinally from the rear end of the floor panel 1 and is shaped in a semi-circle at the front half thereof. The spare tire 3 is accommodated in the pocket 2 and is secured to the pocket 2 by a clamp (not shown) and the like.

Figure 3:
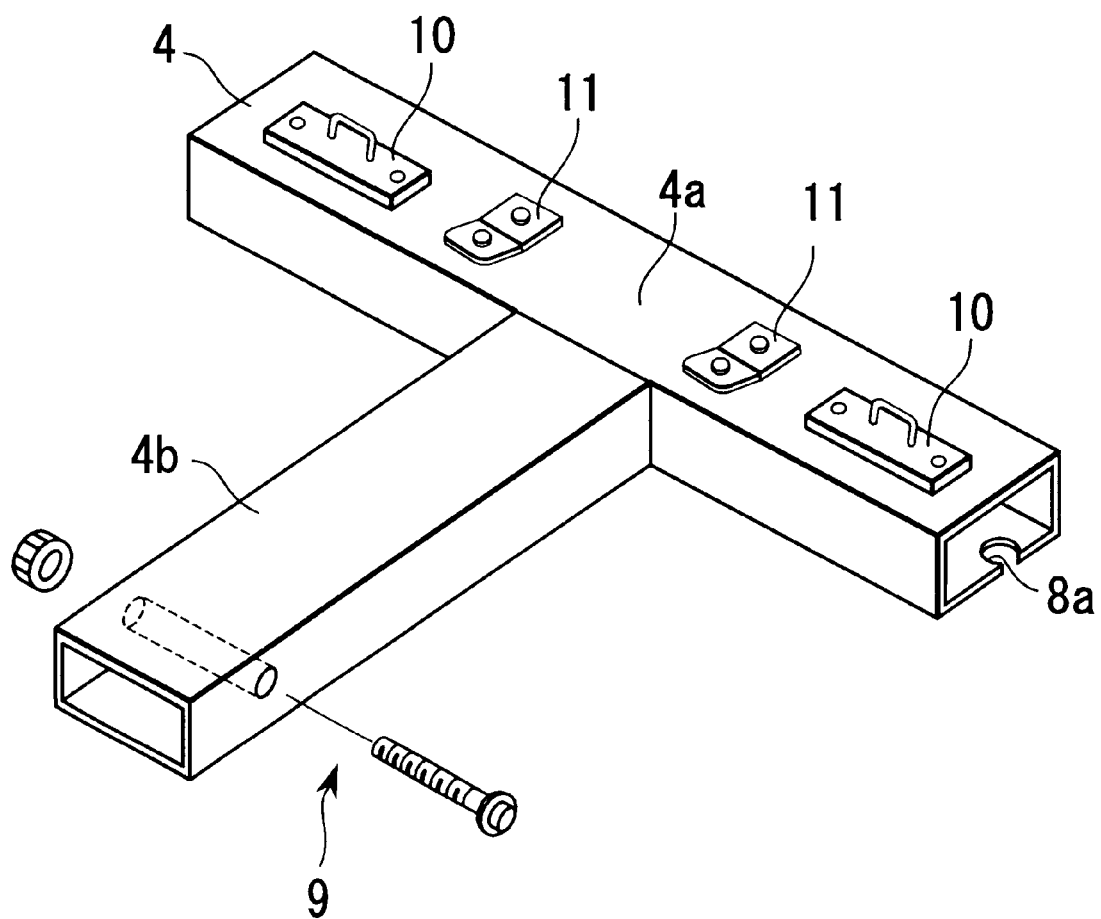
FIG. 3 is a perspective view of a reinforcement member.
Figure 4:
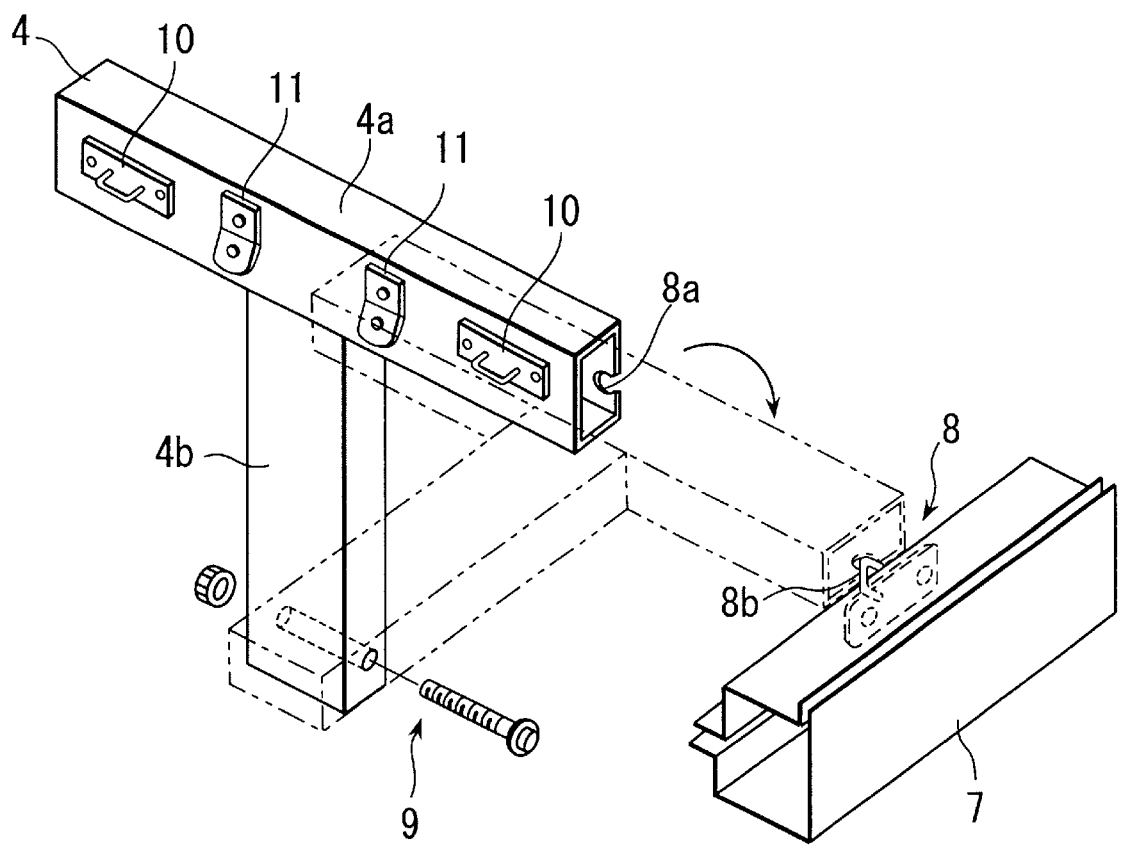
FIG. 4 is an explanatory view showing a movement of a reinforcement member.
Figure 5:
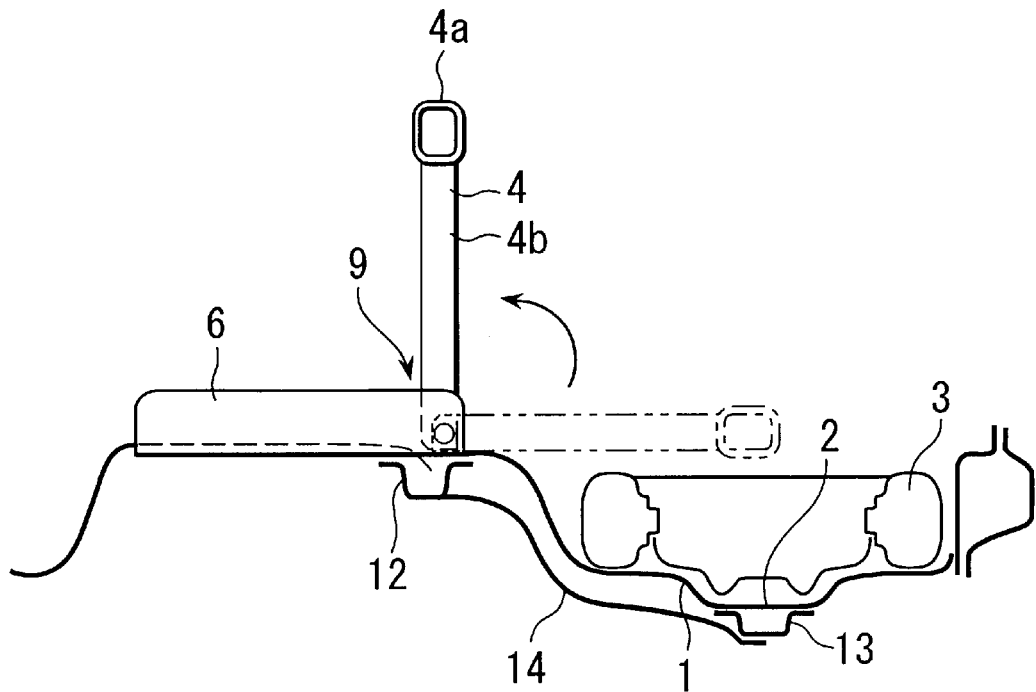
FIG. 5 is an explanatory view showing a movement of a reinforcement member.

As shown in FIG. 3, the reinforcement member 4 has a T-shaped configuration and is constituted by two elongated tubular beams having a rectangular cross section. That is, the reinforcement member 4 has a transverse section 4a extending in a lateral direction and a connecting section 4b forwardly extending from the mid-portion of the transverse section 4a. As shown in FIG. 4, the transverse section 4a can be locked up at both ends thereof with respective side members 7. Further, the connecting section 4b is rotatably connected at the front end thereof with the center member 6 through a hinge 9. That is, the reinforcement member 4 is locked up with the vehicle body so as to cover a part of the opening of the pocket 2. Further, as shown in FIG. 5, the spare tire 3 can be taken out of the opening of the pocket 2 by upwardly rotating the reinforcement member 4. The transverse section 4a has a pair of left and right strikers 10, 10 for fixing the seat 5 and a pair of left and right seat belt anchorages 11, 11 for anchoring a seat belt 5a on the top surface thereof, respectively. In this embodiment, respective strikers 10 are disposed laterally outside of the respective seat belt anchorages 11.

The seat 5 has a pair of left and right engagement sections (not shown) engageable with the respective strikers 10 at the lower and rear part of the seat 5 and is detachably connected at the lower and front part of the seat 5 with the floor panel 1. According to the embodiment, the seat 5 is disposed in a rearmost row and is detachable when the layout of the passenger compartment is changed or when the spare tire 3 is taken out.

Further, as shown in FIG. 2, the seat belt 5a for holding a passenger of the seat 5 passes through a clearance of a seat cushion 5b and seat back 5c and reaches the seat belt anchorage 11.

As shown in FIG. 4, the lock-up mechanism 8 is constituted by a pair of left and right latches 8a, 8a, lock strikers 8b, 8b disposed on the side wall of respective side members 7, 7 and the like. The engagement of the latch 8a and the lock striker 8b can be released from outside.

Further, as shown in FIG. 2, there are provided a first cross member 12, a second cross member 13 and a reinforcement 14 for respectively reinforcing the floor panel 1 on the undersurface of the floor panel 1.

The first cross member 12 extends in the widthwise direction and is connected with the floor panel 1 at the front of the pocket 2. Further, the second cross member 13 extends in the widthwise direction and is connected with the floor panel on the undersurface of the pocket 2. The respective cross members 12, 13 have hat-shaped cross sections and further these form closed cross sections together with the floor panel 1, respectively.

Further, the reinforcement 14 extending in a longitudinal direction of the vehicle is connected at the front end thereof with the undersurface of the first cross member 12 and is connected at the rear end thereof with the undersurface of the second cross member 13. Thus, a closed cross section is formed by the floor panel 1, the respective cross members 12, 13 and the reinforcement 14 covering the floor panel 1 and the cross members 12, 13. In this embodiment, the reinforcement 14 is provided plurally in a widthwise direction of the vehicle.

The spare tire 3 is taken out in the following manner. An operator releases the engagement of the seat 5 and the striker 10 to remove the seat 5 from the reinforcement member 4. Then, the operator disengages the latch from the striker 8b of the lock-up mechanism 8. As shown in FIG. 5, the opening of the pocket 2 is disclosed by upwardly rotating the reinforcement member 4 and the operator takes the spare tire 3 through the opening of the pocket 2.

When the vehicle has a rear end collision, the spare tire 3 moves upward. At this moment, the reinforcement member 4 prevents the spare tire 3 from moving upward. As shown in FIG. 1, since the reinforcement member 4 is connected with the center member 6 and the side member 7, a deformation of the reinforcement member 4 is effectively reduced and the reinforcement member 4 strongly hinders the upward movement of the spare tire 3.

Further, at an event of a rear end collision, the deformation of the floor panel 1 is restricted by the first cross member 12, the second cross member 13 and the reinforcement 14. Further, the spare tire 3 is prevented from moving upward by the restriction from below, the first cross member 12, the second cross member 13 and the reinforcement 14 and by the restriction from above, the reinforcement member 4. Thus, passengers can be protected from being injured by the spare tire 3.

Since the seat 5 is fixed to the reinforcement member 4, the seat does not need a reinforcement member for fixing the seat as needed in prior arts. Further, since the seat belt 5a is fixed to the reinforcement member 4, the seat 5 does not need a reinforcement member for anchoring the seat belt 5a as needed in prior arts, and therefore the weight of the seat 5 can be reduced and the construction of the seat 5 can be simplified.

Further, since the reinforcement member 4 is rotatably disposed, the operator can easily open and close the opening of the recess. Further, the lock-up mechanism 8 prevents the reinforcement member 4 from rotating in an event of a rear end collision.

Further, since the reinforcement member 4 is connected with the center member 6 and the side member 7, respectively, the movement of the spare tire 3 is firmly prevented and as a result passengers sitting on the seat 5 can be surely and effectively protected.

Further, in this embodiment, the reinforcement member 4 is rotatably provided in the center member 6, however it may be rotatably provided in the floor panel 1.

In this embodiment, the reinforcement member has a rectangular cross section, however the cross section may be a circular or other configuration.

Further, in this embodiment, the reinforcement member 4 is rotatably provided in the center member 6, however it may be rotatably provided in the floor panel 1.

Figure 6:
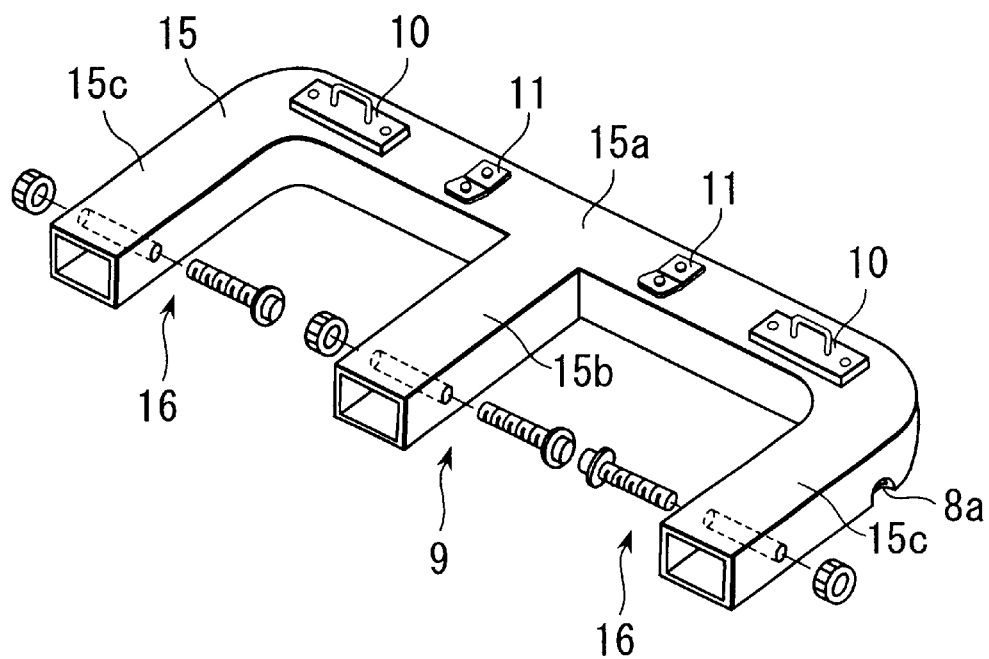
FIG. 6 is a perspective view showing a reinforcement member according to another embodiment.

Further in this embodiment, the reinforcement member 4 has a T-shaped configuration but the embodiment may have any configurations as far as the reinforcement member acts as covering at least a part of the opening of the recess. For example, as shown in FIG. 6, the reinforcement member may have an E-shaped configuration. The reinforcement member 15 has extension sections 15c, 15c forwardly extending from both ends of the transverse section 15a in addition to the connecting section 15b. The extension section 15c is rotatably connected with the side member 7 through a hinge 16. The hinges 16 and 9 share a rotating axis and the reinforcement member 15 can rotate upward around the rotating axis in the same manner as the reinforcement member 4. At an event of the rear end collision, the reinforcement member 15 prevents the spare tire 3 from moving upwards in the same manner as the reinforcement member 4 of the aforesaid embodiment. Particularly, since the extension sections 15c, 15c are fixed to the side members 7, 7 by the lock-up mechanism 8 and the hinge 16, respectively, the reinforcement member 15 has a higher strength than the reinforcement member 4 according to the aforesaid embodiment.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

What is claimed is:

1. A rear body structure of a vehicle having a floor panel, a side member, a pocket provided on said floor panel for accommodating a spare tire assembly therein and a seat disposed above said pocket, comprising:

a reinforcement member hingedly connected with said floor panel and covering at least a part of the opening of said pocket for preventing said spare tire assembly from moving, the reinforcement member being locked up with left and right side members of a vehicle body;

a seat fixing section provided on said reinforcement member for detachably fixing said seat;

a seat belt anchoring section provided on said reinforcement member for anchoring an end portion of a seat belt; and a lock-up mechanism for locking up said reinforcement member with the vehicle body.

2. A rear body structure of a vehicle having a floor panel, a side member, a pocket provided on said floor panel for accommodating a spare tire assembly therein and a seat disposed above said pocket, comprising:

a reinforcement member hingedly connected with said floor panel and covering at least a part of the opening of said pocket for preventing said spare tire assembly from moving;

a seat fixing section provided on said reinforcement member for detachably fixing said seat;

a seat belt anchoring section provided on said reinforcement member for anchoring an end portion of a seat belt; and wherein said reinforcement member is rotatably provided on a center member located at the front of said pocket and longitudinally extending along said floor panel and is locked up at both lateral ends thereof with left and right side members.

3. The rear body structure according to claim 1, wherein said reinforcement member is rotatably provided on a center member located at the front of said pocket and longitudinally extending along said floor panel.

4. The rear body structure according to claim 1 wherein said reinforcement member is locked up at both lateral ends thereof with the left and right side members.

5. The rear body structure according to claim 1, wherein said reinforcement member is rotatably provided on a center member located at the front of said pocket and longitudinally extending along said floor panel and is locked up at both lateral ends thereof with the left and right side members.

6. The rear body structure of claim 1, wherein said reinforcement member is T-shaped and includes a transverse section extending in a lateral direction and a connecting section connected at one end to said transverse section and having an opposite end with a hinge support section for hinged connection of said reinforcement member with said floor panel.

7. The rear body structure of claim 6 further comprising a center member located at a front end of said pocket and longitudinally extending along said floor panel, and said center member having a hinge connection end for providing the hinged connection of said reinforcement member with said floor panel.

8. The rear body structure of claim 6 wherein said lock-up mechanism includes latch devices provided at opposite ends of said transverse section for locking the reinforcement member with the left and right side members of the vehicle body.

9. The rear body structure of claim 1 wherein said lock-up mechanism includes a left pair latch and lock striker combination and a right pair latch and lock striker combination respectively positioned at said left and right side members of the vehicle body for locking up said reinforcement member with the vehicle body.

\* \* \* \* \*